(12) United States Patent
Inoue et al.

(10) Patent No.: US 9,869,856 B2
(45) Date of Patent: Jan. 16, 2018

(54) ILLUMINATION DEVICE AND PROJECTOR

(71) Applicant: SEIKO EPSON CORPORATION, Tokyo (JP)

(72) Inventors: Nozomu Inoue, Matsumoto (JP); Akira Miyamae, Fujimi-Machi (JP); Shigehiro Yanase, Matsumoto (JP); Hiroyuki Shindo, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/903,958

(22) PCT Filed: Aug. 1, 2014

(86) PCT No.: PCT/JP2014/004048
§ 371 (c)(1),
(2) Date: Jan. 8, 2016

(87) PCT Pub. No.: WO2015/019591
PCT Pub. Date: Feb. 12, 2015

(65) Prior Publication Data
US 2016/0170199 A1    Jun. 16, 2016

(30) Foreign Application Priority Data
Aug. 5, 2013   (JP) ................. 2013-162610

(51) Int. Cl.
*H04N 9/31* (2006.01)
*G02B 26/00* (2006.01)
(Continued)

(52) U.S. Cl.
CPC ......... *G02B 26/008* (2013.01); *G03B 21/005* (2013.01); *G03B 21/14* (2013.01);
(Continued)

(58) Field of Classification Search
CPC .... G03B 21/14; G03B 21/204; G03B 21/206; G03B 21/2013; G03B 21/005; H04N 9/3158; G02B 26/008
See application file for complete search history.

(56) References Cited

U.S. PATENT DOCUMENTS 5,313,479 A * 5/1994 Florence ............. G02B 5/0236
                                                    348/E9.026
5,473,409 A * 12/1995 Takeda ................ G03F 7/70575
                                                    355/53
(Continued)

FOREIGN PATENT DOCUMENTS

JP   H06-208089 A    7/1994
JP   2002-023659 A   1/2002
(Continued)

OTHER PUBLICATIONS

Nov. 11, 2014 Search Report issued in International Patent Application No. PCT/JP2014/004048.
(Continued)

*Primary Examiner* — Paulos M Natnael
*Assistant Examiner* — Sean Haiem
(74) *Attorney, Agent, or Firm* — Oliff PLC

(57) ABSTRACT

An illumination device including a light source device, a rotary diffusion plate, which includes a first surface, a second surface, a diffusion section disposed on the first surface, and a detection section disposed on at least one of the first surface and the second surface, and to which light from the light source device is input, a light collecting optical system to which light from the diffusion section is input, a detector adapted to detect light from the detection section, and a control device adapted to control the light source device in accordance with a signal output from the detector. The detection section is disposed at a position
(Continued)

different from a position where the light from the light source device enters the diffusion section.

18 Claims, 9 Drawing Sheets

(51) Int. Cl.
  *G03B 21/00* (2006.01)
  *G03B 21/14* (2006.01)
  *G03B 21/20* (2006.01)

(52) U.S. Cl.
  CPC ......... *G03B 21/204* (2013.01); *G03B 21/206* (2013.01); *G03B 21/2013* (2013.01); *H04N 9/3158* (2013.01)

(56) References Cited

U.S. PATENT DOCUMENTS

| | | | | |
|---|---|---|---|---|
| 5,756,981 | A * | 5/1998 | Roustaei | G03F 7/705 235/462.07 |
| 5,999,245 | A * | 12/1999 | Suzuki | G03F 7/7035 355/53 |
| 2002/0180967 | A1* | 12/2002 | Shio | G01J 3/2803 356/326 |
| 2009/0323027 | A1* | 12/2009 | Uchikawa | G02B 27/104 353/31 |
| 2010/0245776 | A1* | 9/2010 | Yamamoto | G03B 21/204 353/38 |
| 2011/0304831 | A1* | 12/2011 | Yoshigai | G03B 21/2033 353/85 |
| 2012/0019788 | A1* | 1/2012 | Katou | G02B 26/0833 353/33 |
| 2013/0038736 | A1* | 2/2013 | Yamamura | B60Q 1/143 348/148 |
| 2013/0335710 | A1* | 12/2013 | Okamoto | G02F 1/29 353/30 |
| 2015/0022787 | A1* | 1/2015 | Yang | G03B 21/204 353/84 |

FOREIGN PATENT DOCUMENTS

| | | |
|---|---|---|
| JP | 2005-250384 A | 9/2005 |
| JP | 2007-060272 A | 3/2007 |
| JP | 2010-231063 A | 10/2010 |
| JP | 2011-113071 A | 6/2011 |
| JP | 2011-117989 A | 6/2011 |
| JP | 2012-150349 A | 8/2012 |
| JP | 2012-194268 A | 10/2012 |
| JP | 2013-054167 A | 3/2013 |
| JP | 2013-083703 A | 5/2013 |

OTHER PUBLICATIONS

Feb. 15, 2017 European Search Report issued in European Patent Application No. 14834636.4.

* cited by examiner

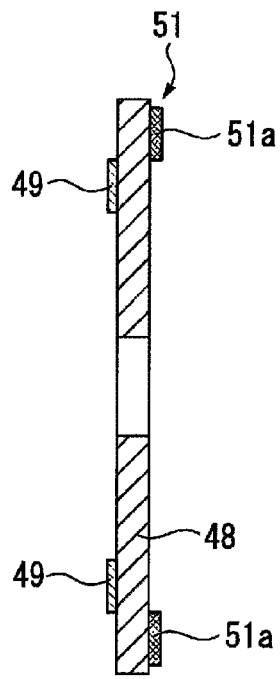 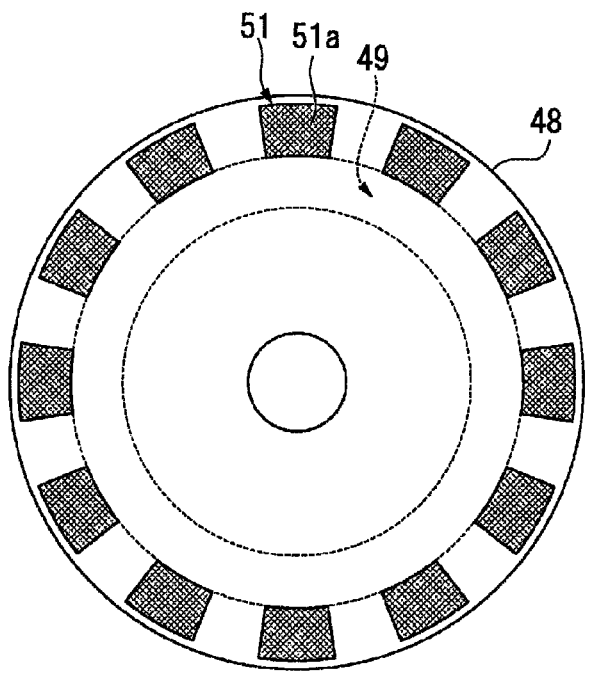
FIG. 4A  FIG. 4B
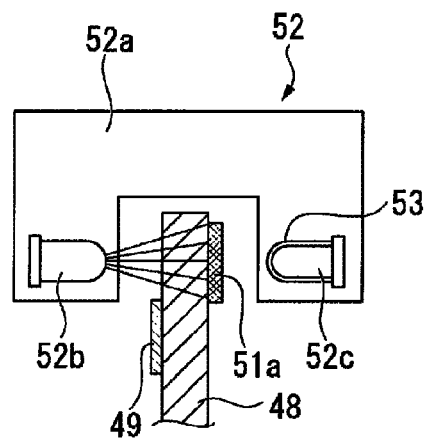
FIG. 5

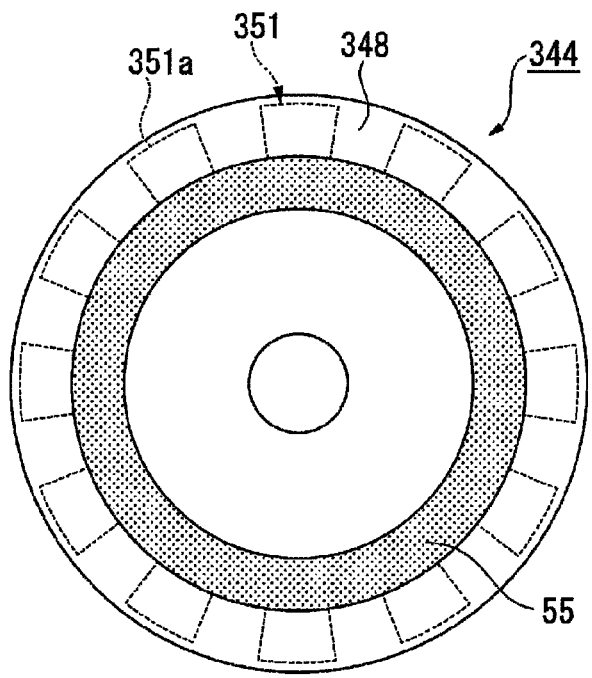
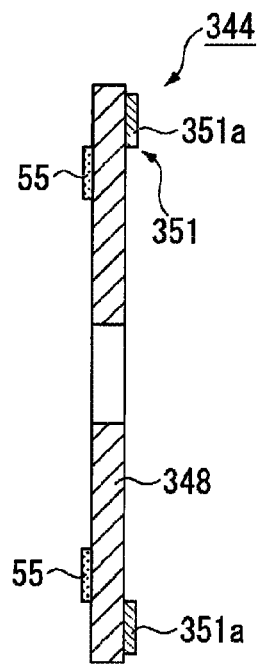
FIG.11A FIG.11B
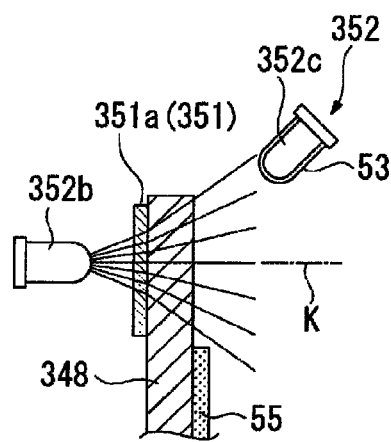
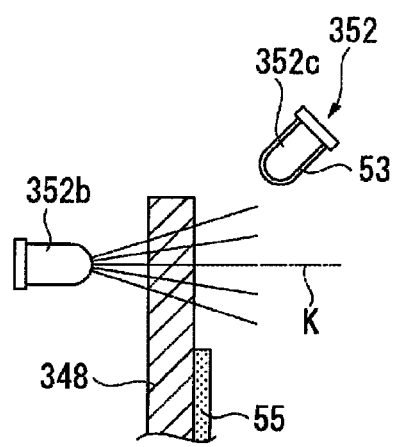
FIG.12A FIG.12B

ILLUMINATION DEVICE AND PROJECTOR

BACKGROUND

1. Technical Field

The present invention relates to an illumination device and a projector.

2. Related Art

As one of the light source devices used for projectors, there has been proposed a light source device for irradiating a phosphor layer with a laser beam as excitation light to generate fluorescence different in wavelength from the excitation light as described in JP-A-2011-113071.

In the light source device described above, a reflecting member is provided to a light transmissive member attached to a part of a rotary wheel to detect a rotation based on a periodic change of the reflected light due to the rotation. Thus, occurrence of a failure such as dropout caused in the rotary wheel is detected.

However, in the related art technology described above, since it is required to provide a complicated mechanism to the attachment section of the transmissive member, it takes cost, and a failure of a detection mechanism is apt to occur, which might cause a false detection. Further, since a detection section is disposed in an area overlapping the transmissive member, in the case of, for example, applying the technology to a transmissive diffusion wheel, there is also a problem that the detection method is limited in such a manner that the detection section is required not to hinder an effective use of the light used for display.

SUMMARY

One of aspects of the invention is made for solving the problem described above, and has an object of providing an illumination device and a projector capable of appropriately detecting a failure caused in the wheel with a simple configuration.

According to a first aspect of the invention, there is provided an illumination device including a light source device, a rotary diffusion plate, which includes a first surface, a second surface, a diffusion section disposed on the first surface, and a detection section disposed on at least one of the first surface and the second surface, and to which light from the light source device is input, a light collection optical system to which light from the diffusion section is input, a detector adapted to detect light from the detection section, and a control device adapted to control the light source device in accordance with a signal output from the detector, wherein the detection section is disposed at a position different from a position where the light from the light source device enters the diffusion section.

According to the illumination device related to the first aspect of the invention, since the detection section is disposed at a position different from the position where the light from the light source device enters the diffusion section, the problem that the light emitted from the diffusion section is hindered by the detection section can be prevented from occurring. Further, since there is adopted the simple configuration of adjusting the position at which the detection section is disposed, cost reduction can be achieved. Therefore, there is provided the illumination device superior in versatility, in which the detection method is not particularly limited irrespective of which one of the transmissive structure and the reflective structure is provided to the rotary diffusion plate, and the trouble caused in the rotary diffusion plate can be detected by appropriately detecting the light from the detection section.

Further, it is also possible for the detection section to have a function of blocking the light input. According also to this configuration, the failure state of the detection section can be determined.

Further, the detection section is preferably disposed on the second surface.

In this case, since the detection section is disposed on the surface different from the surface provided with the diffusion section, the problem that the diffusion section and the detection section are stacked on each other to thereby block the light from the diffusion section can be prevented from occurring.

In the first aspect of the invention described above, it is possible to adopt a configuration in which the detection section diffuses at least a part of the light input. According to this configuration, the detection section can be formed using a part of the diffusion section.

Further, the detection section is preferably disposed on the first surface.

In this case, the detection section and the diffusion section can be formed in the same process.

Further, it is desirable for the detector to be disposed at a position distant from an extension line of a principal ray of the light input to the detection section.

In this case, the detection section can be formed using a part of the diffusion section. Further, since the detector is disposed at a position distant from the extension line of the principal ray of the light entering the detection section, the light diffused by the detection section to radially spread can appropriately be detected. Further, since the detector is disposed at a position distant from the rotary diffusion plate, the problem that the detector and the rotary diffusion plate have contact with each other can be prevented from occurring.

In the first aspect of the invention described above, it is possible to adopt a configuration in which the light source device includes a first light source and a second light source, light from the first light source enters the diffusion section, and light from the second light source enters the detection section.

According to this configuration, the function can be shared by the first light source and the second light source. Further, the wavelength of the light to be input to the diffusion section and the wavelength of the light to be input to the detection section can arbitrarily be set independently of each other.

Further, it is desirable that the light emitted from the first light source and the light emitted from the second light source are different in wavelength band from each other.

According to this configuration, false detection by the detector can be prevented from occurring.

Further, it is desirable that the light emitted from the first light source and the light emitted from the second light source are different in wavelength band from each other.

According to this configuration, the function can be shared by the first light source and the second light source. Therefore, the light from the first light source can appropriately be emitted to the outside as the illumination light.

In the first aspect of the invention described above, it is possible to adopt a configuration in which the detection section reflects at least a part of the light input.

According to this configuration, the rotational state of the rotary diffusion plate can be detected using the reflected light.

In the first aspect of the invention described above, it is possible to adopt a configuration in which the detection section includes a plurality of detection patterns disposed in a dashed manner along a rotational direction of the rotary diffusion plate.

According to this configuration, since the detection section can be formed of a plurality of dashed detection patterns along the rotational direction of the rotary diffusion plate, the periodic signal can appropriately be detected in accordance with the rotation of the rotary diffusion plate. Further, it is also possible to easily detect the fact that a trouble has occurred in the detector or the detection light.

In the first aspect of the invention described above, it is possible to adopt a configuration in which the diffusion section is a phosphor layer.

According to this configuration, the fluorescent light can be taken out from the diffusion section.

According to a second aspect of the invention, there is provided a projector including an illumination device adapted to emit illumination light, a light modulation device adapted to modulate the illumination light in accordance with image information to thereby form image light, and a projection optical system adapted to project the image light, wherein the illumination device according to the first aspect of the invention is used as the illumination device.

According to the projector related to the second aspect of the invention, since the illumination device described above is provided, the projector itself becomes capable of appropriately detecting a failure in the wheel while achieving cost reduction, and therefore high in reliability.

BRIEF DESCRIPTION OF THE DRAWINGS

FIG. 4A is a diagram showing a cross-sectional configuration of a rotary plate, and FIG. 4B is a planar configuration diagram of the rotary plate.

FIG. 5 is a diagram showing a configuration of an essential part of a detector.

FIG. 11A is a plan view of a fluorescence emitting element, and FIG. 11B is a cross-sectional view of the fluorescence emitting element.

FIG. 12 illustrate diagrams showing a configuration of an essential part of a detector.

DESCRIPTION OF EXEMPLARY EMBODIMENTS

Hereinafter, an embodiment of an illumination device and a projector according to the invention will be explained with reference to the accompanying drawings.

It should be noted that the drawings used in the following explanation show characteristic parts in an enlarged manner in some cases for the sake of convenience of easier understanding of the characteristics, and the dimensional ratios between the constituents and so on are not necessarily the same as actual ones.

(Projector)

Figure 1:
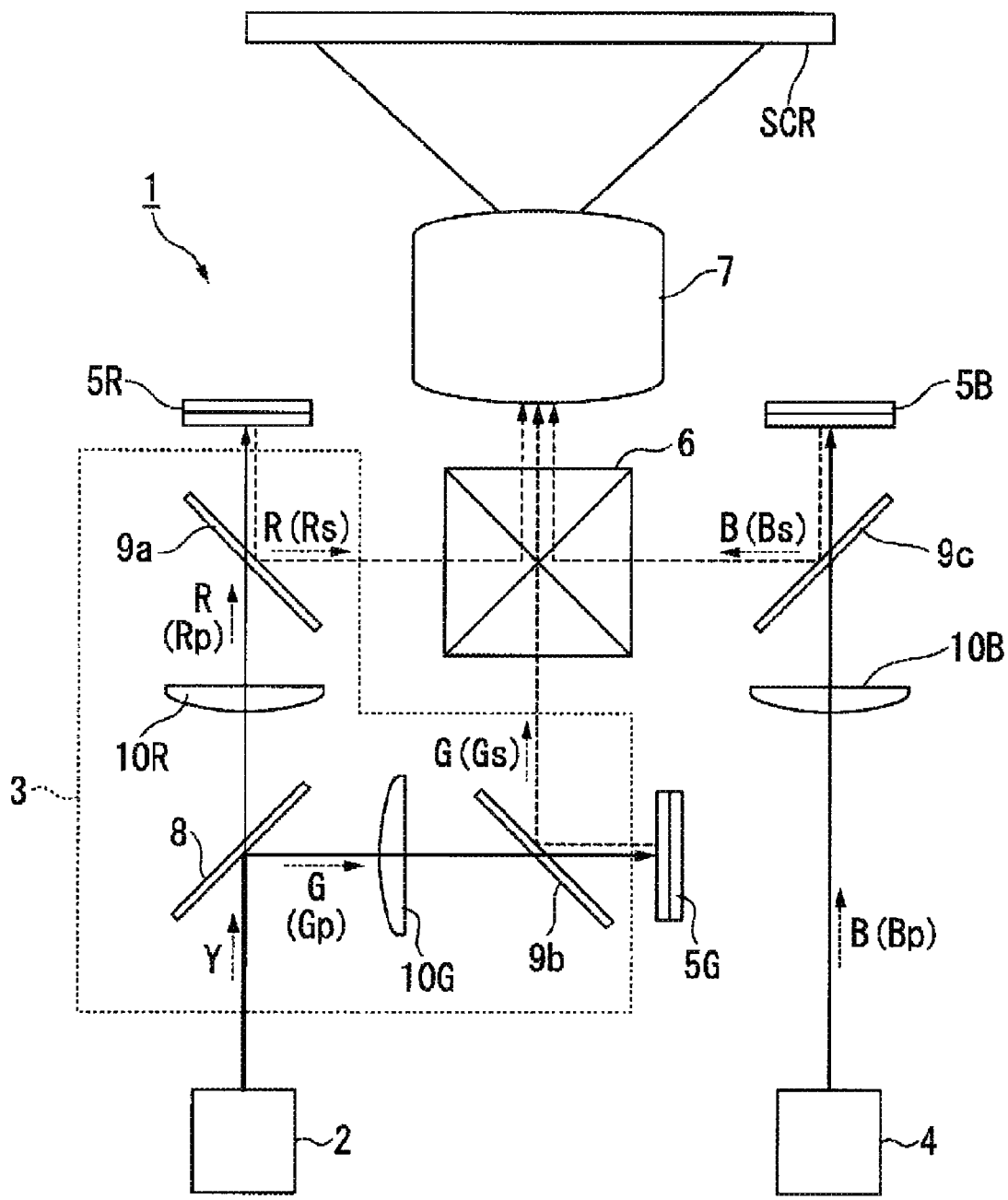
FIG. 1 is a plan view showing a schematic configuration of a projector according to a first embodiment.

Firstly, an example of the projector according to the present embodiment will be explained using the drawings. FIG. 1 is a plan view showing a schematic configuration of a projector 1.

The projector 1 is a projection-type image display device for displaying a color image (an image) on a screen (a projection target surface) SCR. Further, the projector 1 uses three reflective liquid crystal light valves (liquid crystal panels) corresponding respectively to colored light beams, namely red light R, green light G, and blue light B, as a light modulation device. Further, the projector 1 uses semiconductor lasers (laser sources), with which high-intensity and high-power light can be obtained, as light sources of illumination devices.

Specifically, as shown in FIG. 1, the projector 1 is provided with a first illumination device 2 for emitting fluorescent light Y (yellow light), a color separation optical system 3 for separating the fluorescent light Y from the first illumination device 2 into the red light R and the green light G, a second illumination device 4 for emitting the blue light B, three light modulation devices 5R, 5G, and 5B for modulating the respective colored light beams R, G, and B in accordance with image information to form image light beams corresponding respectively to the colored light beams of R, G, and B, a combining optical system 6 for combining the image light beams from the respective light modulation devices 5R, 5G, and 5B, and a projection optical system 7 for projecting the image light beam from the combining optical system 6 toward the screen SCR.

In the first illumination device 2, a phosphor is irradiated with the blue light (excitation light) emitted from the semiconductor laser to thereby excite the phosphor, and thus, the fluorescent light (the yellow light) is emitted from the phosphor. The fluorescent light emitted from the phosphor is adjusted so as to be provided with an even luminance distribution (illuminance distribution), and then emitted toward the color separation optical system 3.

The color separation optical system 3 is provided with a dichroic mirror 8, a first polarization splitting mirror 9a and a second polarization splitting mirror 9b, and field lenses 10R, 10G. Among these components, the dichroic mirror 8 has a function of separating the fluorescent light Y from the first illumination device 2 into the red light R and the green light G, and transmits the red light R thus separated and at the same time reflects the green light G.

The first polarization splitting mirror 9a transmits red light Rp, which has been transmitted through the dichroic mirror 8 and has a predetermined polarization direction (e.g., P-polarization), to make the red light Rp enter the red light modulation device 5R. The first polarization splitting mirror 9a reflects red light Rs, which is the S-polarized light and has been modulated by the red light modulation device 5R, to make the red light Rs enter the combining optical system 6 as described later.

The second polarization splitting mirror 9b transmits green light Gp, which has been reflected by the dichroic mirror and has a predetermined polarization direction (e.g., P-polarization), to make the green light Gp enter the green light modulation device 5G. The second polarization splitting mirror 9b reflects green light Gs, which is the S-polarized light and has been modulated by the green light modulation device 5G, to make the green light Gs enter the combining optical system 6 as described later.

In the second illumination device 4, the blue light B emitted from the semiconductor laser is adjusted so as to have an even luminance distribution (illuminance distribution), and is then emitted toward the blue light modulation device 5B. In the present embodiment, the second illumination device 4 is formed of the illumination device according to the invention. Further, in the light path of the blue light B emitted from the second illumination device 4, there is disposed a third polarization splitting mirror 9c.

The third polarization splitting mirror 9c transmits blue light Bp, which has been emitted from the second illumination device 4 and has a predetermined polarization direction (e.g., P-polarization), to make the blue light Bp enter the blue light modulation device 5B. The third polarization splitting mirror 9c reflects blue light Bs, which is the S-polarized light and has been modulated by the blue light modulation device 5B, to make the blue light Bs enter the combining optical system 6 as described later.

The field lens 10R disposed between the dichroic mirror 8 and the first polarization splitting mirror 9a collimates the red light R. Further, the field lens 10G disposed between the dichroic mirror 8 and the second polarization splitting mirror 9b collimates the green light G. Further, a field lens 10B disposed between the second illumination device 4 and the third polarization splitting mirror 9c collimates the blue light B.

The light modulation devices 5R, 5G, and 5B are each formed of a reflective liquid crystal light valve (a liquid crystal panel), and form the image light beams obtained by modulating the colored light beams R, G, and B in accordance with the image information while reflecting the colored light beams R, G, and B, respectively. Further, the light modulation devices 5R, 5G, and 5B each change the polarization state (e.g., from the P-polarization to the S-polarization) of the image light beam with the modulation.

The combining optical system 6 is formed of a cross dichroic prism, and combines the image light beams with each other, which correspond respectively to the colored light beams R, G, and B having been input from the respective light modulation devices 5R, 5G, and 5B, and then emits the image light beam thus combined toward the projection optical system 7.

The projection optical system 7 is formed of a projection lens group, and projects the image light beam combined by the combining optical system 6 toward the screen SCR in an enlarged manner. Thus, a color picture (image) thus enlarged is displayed on the screen SCR.

Figure 2:
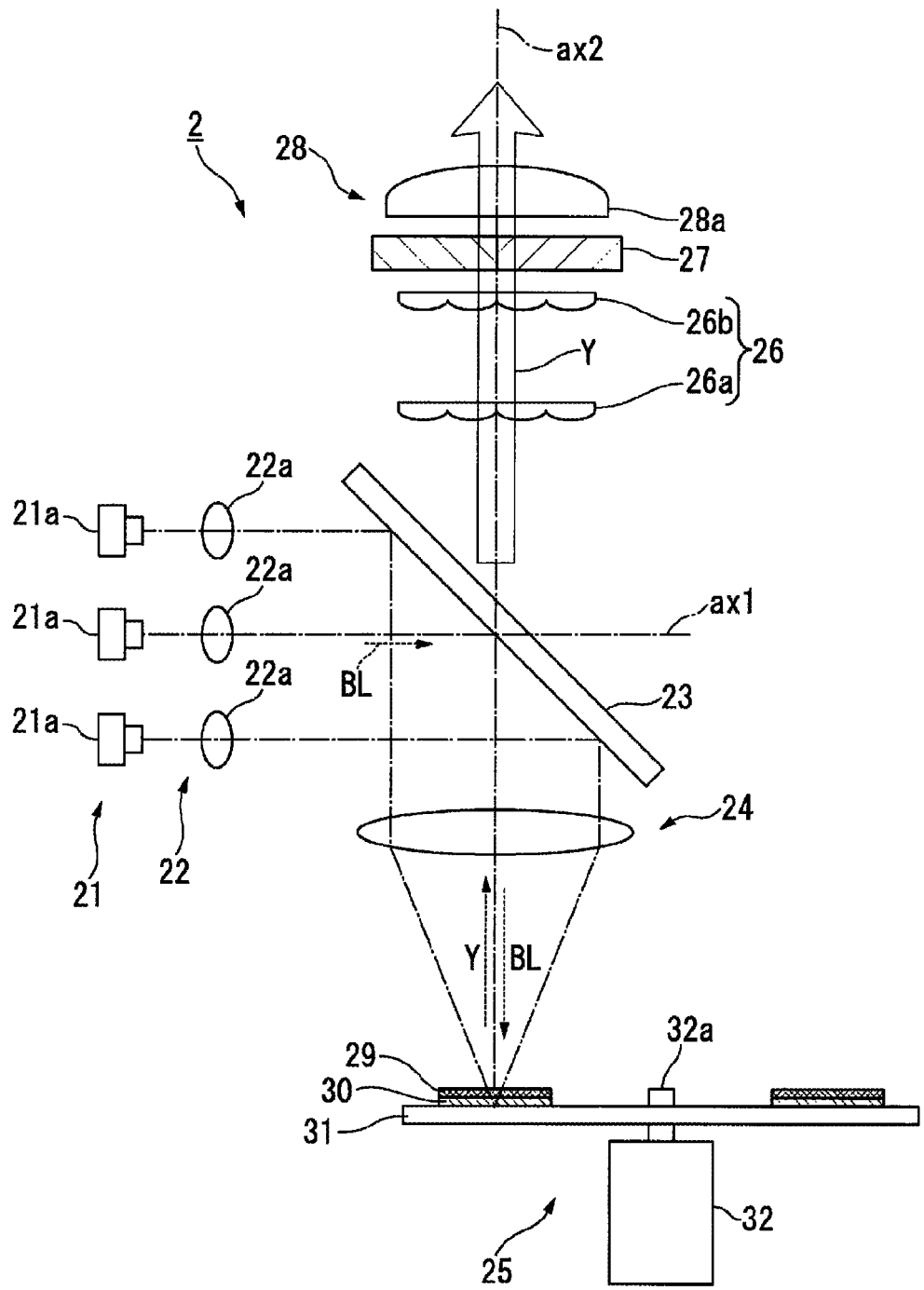
FIG. 2 is a diagram showing a schematic configuration of a first illumination device.

Here, a configuration of the first illumination device 2 will be explained. FIG. 2 is a diagram showing a schematic configuration of the first illumination device 2.

As shown in FIG. 2, the first illumination device 2 is provided with an array light source 21, a collimator optical system 22, a dichroic mirror 23, a light collection optical system 24, a fluorescence emitting element 25, an integrator optical system 26, a polarization conversion element 27, and an overlapping optical system 28 in general.

Further, in the first illumination device 2, on one optical axis ax1 among optical axes ax1 and ax2 perpendicular to each other in the same plane, there are arranged the array light source 21, the collimator optical system 22, and the dichroic mirror 23 side by side in this order. Further, on the other optical axis ax2, there are arranged the fluorescence emitting element 25, the light collection optical system 24, the dichroic mirror 23, the integrator optical system 26, the polarization conversion element 27, and the overlapping optical system 28 side by side in this order.

The array light source 21 is formed of a device having a plurality of semiconductor lasers 21a arranged. Specifically, the plurality of semiconductor lasers 21a is arranged in an array in a plane perpendicular to the optical axis ax1. It should be noted that the array light source 21 can also be provided with, for example, a plurality of solid-state light emitting elements such as light emitting diodes (LED) instead of the plurality of semiconductor lasers 21a.

The semiconductor lasers 21a each emit a blue laser beam (hereinafter referred to as excitation light) BL having a peak wavelength in a wavelength band of, for example, 440 through 480 nm. Further, the excitation light BL emitted from each of the semiconductor lasers 21a is coherent linearly-polarized light, and is emitted toward the dichroic mirror 23 in parallel to the optical axis ax1.

The excitation light BL emitted from the array light source 21 enters the collimator optical system 22.

The collimator optical system 22 is for converting the excitation light BL emitted from the array light source 21 into parallel light, and is formed of, for example, a plurality of collimator lenses 22a arranged side by side in an array corresponding respectively to the semiconductor lasers 21a. Then, the excitation light BL, which has been converted into the parallel light by passing through the collimator optical system 22, enters the dichroic mirror 23.

The dichroic mirror 23 reflects the excitation light BL while transmitting the fluorescent light Y. The dichroic mirror is disposed in a state of being tilted toward the fluorescence emitting element 25 at an angle of 45° with the optical axis ax1. Further, the dichroic mirror 23 is not limited to the dichroic mirror, but a dichroic prism can also be used as the dichroic mirror 23.

The light collection optical system 24 is for collecting the excitation light BL toward the fluorescence emitting element 25, and is formed of at least one collecting lens 24a. Then, the excitation light BL collected by the light collection optical system 24 enters the fluorescence emitting element 25.

The fluorescence emitting element 25 is a so-called reflective rotary phosphor plate, and is provided with a phosphor layer 29 for emitting the fluorescent light Y, a reflecting film 30 for reflecting the fluorescent light Y, a rotary plate (base member) 31 for supporting the phosphor layer 29, and a drive motor 32 for rotationally driving the rotary plate 31. As the rotary plate 31, there is used, for example, a circular plate. It should be noted that the shape of the rotary plate 31 is not limited to the circular plate, but is only required to be a flat plate. The drive motor 32 is electrically connected to a control section not shown. Thus, the control section controls the drive motor 32 to thereby control the rotation of the rotary plate 31. It should be noted that the control section can be formed of a control device CONT described later.

The rotary plate 31 rotates at a predetermined rotational frequency while the projector 1 is in use. Here, the predetermined rotational frequency denotes a frequency at which radiation of the heat, which is accumulated in the fluorescence emitting element 25 due to the irradiation with the excitation light, can be achieved. The predetermined rotational frequency is determined based on data such as the intensity of the excitation light emitted from the array light source 21, the diameter of the rotary plate 31, and the thermal conductivity of the rotary plate 31. The predetermined rotational frequency is set taking the safety rate and so on into consideration. The predetermined rotational frequency is set to a sufficiently high value so as to prevent the phosphor layer 29 from altering in characteristics, and prevent the thermal energy so high as to melt the rotary plate 31 from being accumulated.

In the present embodiment, the predetermined rotational frequency described above is set to, for example 7,500 rpm. In this case, the rotary plate 31 has a diameter of 50 mm, and is configured so that the light axis of the blue light entering the phosphor layer 29 is located at a position approximately 22.5 mm distant from the rotational center of the rotary plate 31. In other words, in the rotary plate 31, the irradiation spot of the blue light moves at a speed of roughly 18 m/sec so as to draw a circle around a rotational axis.

On a surface of the rotary plate 31 to which the excitation light BL is input, there are stacked the reflecting film 30 and the phosphor layer 29. The reflecting film 30 is disposed between the rotary plate 31 and the phosphor layer 29. Further, the reflecting film 30 and the phosphor layer 29 are each disposed in the circumferential direction of the rotary plate 31 so as to form a ring-like shape. Further, the excitation light BL enters the phosphor layer 29 from an opposite side to the reflecting film 30.

The phosphor layer 29 includes the phosphor to be excited when absorbing the excitation light BL. The phosphor excited by the excitation light BL emits the fluorescent light Y having a peak wavelength in a wavelength band of, for example, 500 through 700 nm as first illumination light.

The reflecting film 30 is formed of, for example, a dielectric multilayer film, and reflects the fluorescent light Y, which has been emitted from the phosphor layer 29, toward the side to which the excitation light BL is input.

The rotary plate 31 is formed of a circular plate made of metal high in thermal conductivity such as copper, and a central portion of the rotary plate 31 is attached to a rotary shaft 32a of the drive motor 32.

The drive motor 32 moves the irradiation position of the excitation light BL collected by the light collection optical system 24 with respect to the phosphor layer 29 while rotating the rotary plate 31 in the circumferential direction. Thus, it is possible to improve the heat radiation effect of the heat generated in the phosphor layer 29 due to the irradiation with the excitation light BL.

Then, the fluorescent light Y emitted from the fluorescence emitting element 25 passes through the light collection optical system 24, and then enters the dichroic mirror 23. Further, the fluorescent light Y having been transmitted through the dichroic mirror 23 enters the integrator optical system 26.

The integrator optical system 26 is for homogenizing the luminance distribution (illuminance distribution) of the fluorescent light Y, and is formed of, for example, a lens array 26a and a lens array 26b. The lens array 26a and the lens array 26b are each formed of an element having a plurality of lenses arranged in an array. Further, the integrator optical system 26 is not limited to these lens arrays 26a, 26b, but it is also possible to use, for example, a rod integrator. Then, the fluorescent light Y, which has passed through the integrator optical system 26, and has thus been homogenized in luminance distribution, enters the polarization conversion element 27.

The polarization conversion element 27 is for uniforming the polarization direction of the fluorescent light Y, and is formed of, for example, a combination of a polarization splitting film and a wave plate. Then, the fluorescent light Y, which has passed through the polarization conversion element 27, and has thus been uniformed in the polarization direction to, for example, the P-polarization component, enters the overlapping optical system 28.

The overlapping optical system 28 is for overlapping a plurality of light beams emitted from the integrator optical system 26 each other on an illumination target area such as the light modulation device, and is formed of at least one overlapping lens 28a. The fluorescent light Y is overlapped by the overlapping optical system 28 to thereby be homogenized in the luminance distribution (the illuminance distribution), and at the same time, enhanced in the axisymmetric property around the ray axis thereof. Then, the fluorescent light Y having been overlapped by the overlapping optical system 28 enters the color separation optical system 3 (the dichroic mirror 8) shown in FIG. 1.

In the first illumination device 2 having such a configuration as described above, it is possible to emit the fluorescent light (the yellow light) Y, which has been adjusted to have an even luminance distribution (illuminance distribution), toward the dichroic mirror 8 shown in FIG. 1 as the first illumination light.

It should be noted that the first illumination device 2 is not necessarily limited to the configuration shown in FIG. 2, it is also possible to adopt a configuration in which, for example, an afocal optical system for adjusting the spot diameter of the excitation light BL, a homogenizer optical system for converting the intensity distribution of the excitation light BL into an even state (a so-called top-hat distribution), and so on are disposed in a light path between the collimator optical system 22 and the dichroic mirror 23.

Further, although in the first illumination device 2, there is used the dichroic mirror 23 for reflecting the excitation light BL and transmitting the fluorescent light Y, it is also possible to use a dichroic mirror for transmitting the excitation light BL and reflecting the fluorescent light Y. In this case, there is adopted a configuration in which the array light source 21, the collimator optical system 22, the dichroic mirror 23, the light collection optical system 24, and the fluorescence emitting element 25 are sequentially arranged side by side on one optical axis ax1, and the dichroic mirror 23, the integrator optical system 26, the polarization conversion element 27, and the overlapping optical system 28 are sequentially arranged side by side on the other optical axis ax2.

Figure 3:
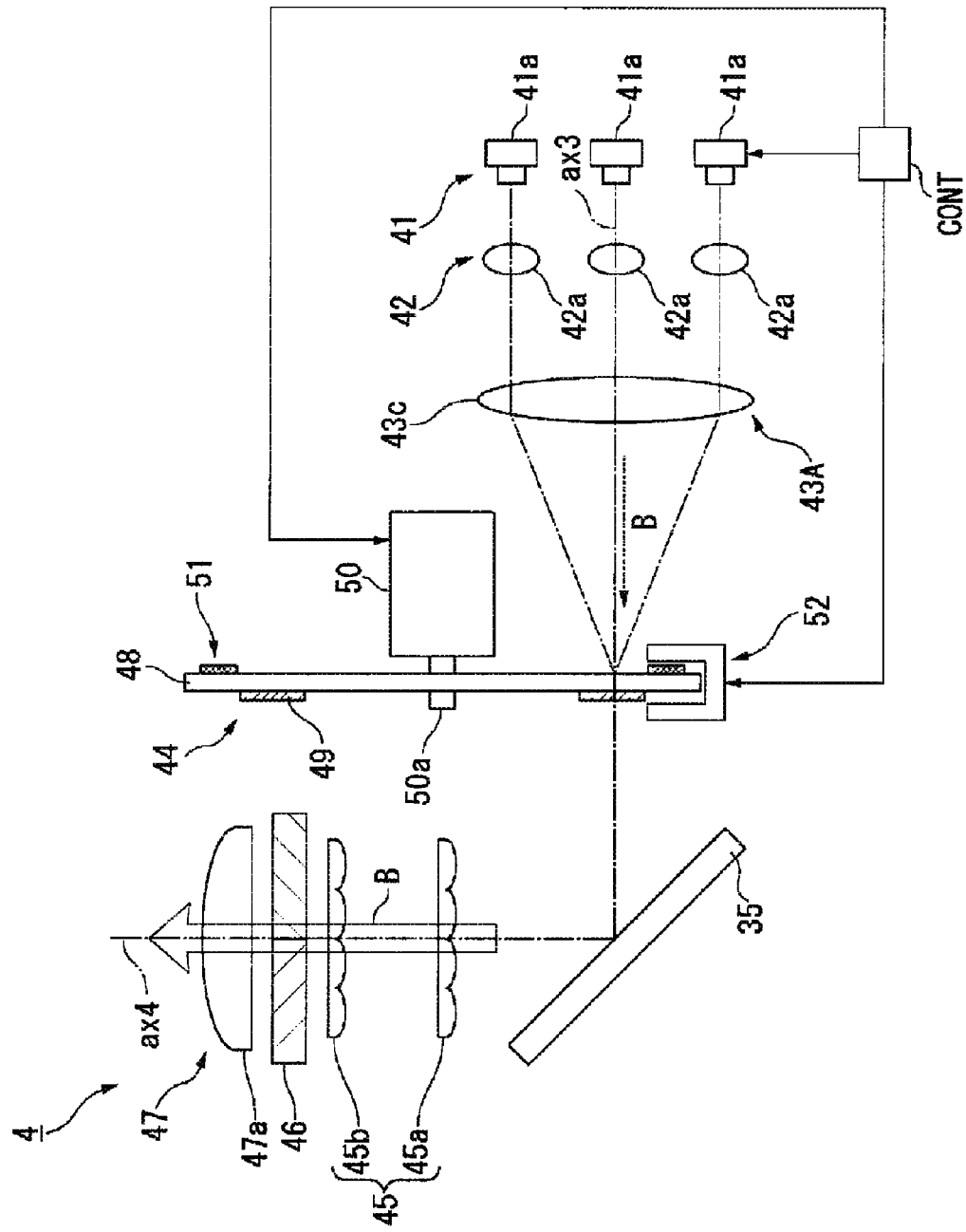
FIG. 3 is a plan view showing a schematic configuration of a second illumination device.

Then, a specific configuration of the second illumination device 4 described above will be explained as an example of the illumination device, to which the invention is applied, with reference to the drawings. FIG. 3 is a plan view showing a schematic configuration of the second illumination device 4.

As shown in FIG. 3, the second illumination device 4 is provided with an array light source (a first light source) 41 as the light source device in the invention, a collimator optical system 42, a light collection optical system 43A, a light diffusion element 44, a mirror member 35, an integrator optical system 45, a polarization conversion element 46, and an overlapping optical system (a light collection optical system) 47.

In the second illumination device 4, there are arranged the array light source 41, the collimator optical system 42, the light collection optical system 43A, the light diffusion element 44, and the mirror member 35 side by side in this order on one optical axis ax3 among optical axes ax3 and ax4 perpendicular to each other in the same plane. Further, on the other optical axis ax4, there are arranged the mirror member 35, the integrator optical system 45, the polarization conversion element 46, and the overlapping optical system 47 side by side in this order.

The array light source 41 is formed of a device having a plurality of semiconductor lasers 41a arranged. It should be noted that the array light source 41 can also be provided with, for example, a plurality of solid-state light emitting elements such as light emitting diodes (LED) instead of the plurality of semiconductor lasers 41*a*.

In the present embodiment, the plurality of semiconductor lasers 41*a* is arranged in an array in a plane perpendicular to the optical axis ax3. The array light source 41 is electrically connected to the control device CONT, and the drive of the array light source 41 is controlled.

The control device CONT is realized including a CPU (central processing unit), a ROM (read only memory), and a RAM (random access memory) (all not shown). The CPU reads out a control program stored in the ROM, then develops the control program in the RAM, and then executes steps of the program on the RAM. Due to the execution of the program by the CPU, the control device CONT controls the operation of the array light source 41.

It should be noted that the control device CONT can be a device for performing overall control of the projector 1.

The semiconductor lasers 41*a* each emit a blue laser beam (hereinafter referred to as blue light) B having a peak wavelength in a wavelength band of, for example, 440 through 480 nm as second illumination light. Further, the blue light B emitted from each of the semiconductor lasers 41*a* is coherent linearly-polarized light, and is emitted toward the light diffusion element 44 in parallel to the optical axis ax3. Then, the blue light B having been emitted from the array light source 41 enters the collimator optical system 42.

The collimator optical system 42 is for converting the blue light B emitted from the array light source 41 into parallel light, and is formed of, for example, a plurality of collimator lenses 42*a* arranged side by side in an array corresponding respectively to the semiconductor lasers 41*a*. Then, the blue light B, which has been converted into the parallel light by passing through the collimator optical system 42, enters the light collection optical system 43A.

The light collection optical system 43A is for collecting the blue light B toward the light diffusion element 44, and is formed of at least one collecting lens 43*c*. Then, the blue light B collected by the light collection optical system 43A enters the light diffusion element 44.

The light diffusion element 44 includes a rotary plate (a rotary diffusion plate) 48, which is a so-called transmissive rotary diffusion plate, and transmits the blue light B collected by the light collection optical system 43A, a light diffusion layer (a diffusion section) 49 disposed on the light exit surface side of the rotary plate 48, a detection pattern (a detection section) 51 disposed on the surface-of-incidence-of-light side of the rotary plate 48, a drive motor 50 for rotationally driving the rotary plate 48, and a detector 52 for detecting the light from the detection pattern 51. The detector 52 is electrically connected to the control device CONT, and transmits the detection result (the intensity of the light from the detection pattern 51) to the control device CONT. The control device CONT controls the drive of the array light source 41 based on the detection result transmitted (the signal output) from the detector 52.

The rotary plate 48 is formed of a circular plate having a light transmissive property and made of, for example, glass or optical resin, and a central portion of the rotary plate 48 is attached to a rotary shaft 50*a* of the drive motor 50.

FIG. 4 are diagrams showing a configuration of an essential part of the rotary plate 48, wherein FIG. 4A is a diagram showing a cross-sectional configuration of the rotary plate 48, and FIG. 4B is a diagram showing a planar configuration of the rotary plate 48 viewed from the surface-of-incidence-of-light side.

As shown in FIGS. 4A and 4B, on the surface of incidence of light (a first surface) of the rotary plate 48, there is disposed the detection pattern 51 along the circumferential direction. The detection pattern 51 includes a plurality of light blocking patterns 51*a*. Further, on the light exit surface (a second surface) of the rotary plate 48, there is disposed the light diffusion layer 49 having a ring-like shape along the circumferential direction. It should be noted that in the present specification, among the first surface and the second surface provided to the rotary plate, the surface to which the light from the light source device is input is referred to as a surface of incidence of light, and the other surface is referred to as a light exit surface.

In the present embodiment, the detection pattern 51 is disposed on the outer side in the radial direction in the rotary plate 48 with respect to the light diffusion layer 49. In other words, the detection pattern 51 is disposed at a position shifted in a planar view from the position (the area where the light diffusion layer 49 is formed) where the light from the array light source 41 enters the light diffusion layer 49.

Further, in the present embodiment, the detection pattern 51 and the light diffusion layer 49 are disposed along respective circles concentric with each other with respect to the rotational center (the center) of the rotary plate 48 having a circular shape. Therefore, the distance between the rotational center of the rotary plate 48 and the detection pattern 51 (the circle passing through the center in the radial direction of each of the light blocking patterns 51*a*) is different from the distance between the rotational center and the light diffusion layer 49 (the circle passing through the center in the radial direction of the light diffusion layer 49). It should be noted that the shape of the rotary plate 48 is not limited to the circular plate, but is only required to be a flat plate.

It should be noted that in order to improve the diffusivity of the light, it is possible to form the light diffusion layer 49 on both surfaces of the rotary plate 48. Further, it is also possible for the rotary plate 48 to be provided with an antireflection film corresponding to the wavelength of the blue light B in order to avoid reflection of unwanted light. In the present embodiment, it is sufficient for the antireflection film described above to be formed on the surface of the rotary plate 48 on the side where the detection pattern 51 is formed, for example.

The detection pattern 51 includes the plurality of light blocking patterns 51*a* disposed in a dashed manner by applying light blocking ink such as carbon black by printing to form islands, for example. It should be noted that the optical density (the OD value) of the light blocking pattern 51*a* is sufficiently 2 or higher, and is more desirably 3 or higher. The detection pattern 51 is formed by applying an appropriate material having a light blocking property by printing in a separate process from the process of forming the light diffusion layer 49, and therefore, becomes a pattern having a sufficient light blocking property.

Incidentally, the light diffusion layer 49 is formed by, for example, performing screen printing with ink having glass powder (glass frit) kneaded into resin using a printing machine, and then curing the resin by baking. The degree of diffusion of the light depends on, for example, the particle size and the shape (whether the shape is spherical or irregular) of the glass powder, the diffractive index and the density of the glass, the diffractive index of the resin, and the film thickness of the resin. The resin is required to fulfill a condition not to deteriorate at the operating wavelength. Since the heat is generated due to the transmission loss in the diffusion layer, the resin high in heatproof temperature is desirable. Therefore, in the present embodiment, there is used, for example, silicon resin. It should be noted that as a method of disposing the resin described above, it is possible to use injection molding with a metal mold instead of printing.

Further, for the circular plate constituting the rotary plate 48 described above, a material (e.g., so-called super white glass), which is not deteriorated by the light, and is high in heatproof temperature, is desirably used similarly to the resin.

It should be noted that the manufacturing method of the light diffusion layer 49 is not limited to the method described above, but the light diffusion layer 49 can also be formed by performing a frost treatment on the glass surface. Further, it can also be formed by transferring (imprinting) a fine pattern. Alternatively, it can also be formed by welding glass powder, for example, semi-melting glass lower in melting point than the rotary plate 48.

As the drive motor 50, there is used, for example, a brushless DC motor. The drive motor 50 moves the irradiation position of the blue light B with respect to the light diffusion layer 49 by rotating the rotary plate 48 in the circumferential direction. Thus, it is possible to enhance the light diffusion effect of the blue light B, and at the same time to enhance the heat radiation effect of the light diffusion element 44. Then, the blue light B having been diffused by the light diffusion element 44 enters the mirror member 35. It should be noted that the drive motor 50 is electrically connected to the control device CONT, and the drive of the drive motor 50 is controlled. The control device CONT detects the rotational state (e.g., the rotational direction and the rotational speed) of the drive motor 50. It should be noted that as the detection method of the rotational state of the drive motor 50, there can be cited, for example, a method using a Hall element, and a method of detecting a current flowing through the drive coil and a voltage.

In the present embodiment, the control device CONT makes the drive control of the drive motor 50 and the array light source 41 correspond to each other. For example, the control device CONT stops the drive of the array light source 41 in the case in which it has been detected that the rotation of the rotary plate 48 stops. Thus, the problem that the laser beam is emitted in the state, in which the rotary plate 48 does not rotate, to thereby burn out the rotary plate 48 is prevented from occurring.

The mirror member 35 is for reflecting the blue light B, which has been diffused by the light diffusion element 44, toward the integrator optical system 45. The blue light B having been reflected by the mirror member 35 enters the integrator optical system 45.

The integrator optical system 45 is for homogenizing the luminance distribution (illuminance distribution) of the blue light B, and is formed of, for example, a lens array 45*a* and a lens array 45*b*. The lens array 45*a* and the lens array 45*b* are each formed of an element having a plurality of lenses arranged in an array. Further, the integrator optical system 45 is not limited to such lens array 45*a* and lens array 45*b*, but it is also possible to use, for example, a rod integrator. Then, the blue light B, which has passed through the integrator optical system 45, and has thus been homogenized in luminance distribution, enters the polarization conversion element 46.

The polarization conversion element 46 is for uniforming the polarization direction of the blue light B, and is formed of, for example, a combination of a polarization splitting film and a wave plate. Then, the blue light Bp, which has passed through the polarization conversion element 46, and has thus been uniformed in the polarization direction to, for example, the P-polarization, enters the overlapping optical system 47.

The overlapping optical system 47 is for overlapping a plurality of light beams emitted from the integrator optical system 45 each other on an illumination target area such as the light modulation device, and is formed of at least one overlapping lens 47*a*. The blue light B is overlapped by the overlapping optical system 47 to thereby be homogenized in the luminance distribution (the illuminance distribution), and at the same time, enhanced in the axisymmetric property around the ray axis thereof. Then, the blue light B having been overlapped by the overlapping optical system 47 enters the third polarization splitting mirror 9*c* shown in FIG. 1.

In the second illumination device 4 having such a configuration as described above, it is possible to emit the blue light B, which has been adjusted to have an even luminance distribution (illuminance distribution), toward the third polarization splitting mirror 9*c* shown in FIG. 1 as the second illumination light.

It should be noted that the second illumination device 4 is not necessarily limited to the configuration shown in FIG. 3, it is also possible to adopt a configuration in which, for example, an afocal optical system for adjusting the spot diameter of the blue light B, a homogenizer optical system for converting the intensity distribution of the blue light B into an even state (a so-called top-hat distribution), and so on are disposed in a light path between the collimator optical system 42 and the light collection optical system 43A.

Incidentally, in the case in which some trouble occurs in the rotary plate 48 as described above, the laser beam enters the integrator optical system 45 in the state in which the laser beam is not diffused, namely the state in which the laser beam is not widely spread. The integrator optical system 45 has a structure including the lens arrays 45*a*, 45*b* each having a plurality of lenses arranged in an array. Therefore, in the case in which the laser beam is not diffused, since the light beam enters only a part of the lens arrays 45*a*, 45*b*, there is a possibility that the homogeneity of the illumination between the light modulation devices 5R, 5G, and 5B is lost to degrade the display quality.

In the projector 1, it is arranged that the corresponding number of light sources to the number of cells of the lens array can be seen in the normal operation even if the user looks into, for example, the projection optical system 7. In other words, by increasing the number of distributed light sources, it is avoided that the intense laser beam enters the eyes of the user. Incidentally, in the case in which the diffusion plate does not effectively function as described above, since the light beam of the laser beam enters only a part of the lens arrays 45*a*, 45*b*, the number of distributed light sources decreases, and there is a possibility that the user directly views the intense laser beam.

In contrast, in the second illumination device 4 according to the present embodiment, the control device CONT controls the drive of the array light source 41 based on the detection result transmitted (the signal output) from the detector 52. In the present embodiment, it is arranged that in the case in which some trouble occurs in the rotary plate 48, the control device CONT stops driving the array light source 41.

FIG. 5 is a diagram showing a configuration of an essential part of the detector 52.

The detector 52 is formed of a so-called photo interrupter, and includes a frame section 52a, a light emitting element (a second light source) 52b, and a light receiving element 52c as shown in FIG. 5.

The frame section 52a holds the light emitting element 52b and the light receiving element 52c so that the light emitting element 52b is disposed on the light exit surface side (on the side of the surface on which the light diffusion layer 49 is formed) of the rotary plate 48, the light receiving element 52c is disposed on the surface-of-incidence-of-light side (on the side of the surface on which the detection pattern 51 is formed) of the rotary plate 48, and the light emitting element 52b and the light receiving element 52c are in the state of being opposed to each other. Further, the light emitting element 52b and the light receiving element 52c are disposed so as to be across the detection pattern 51 from each other.

In the present embodiment, the light emitting element 52b is formed of, for example, a light emitting diode (LED). Further, the light receiving element 52c is formed of, for example, a photodiode or a phototransistor.

The light emitting element 52b emits light (e.g., near infrared range of 700 nm through 1,000 nm) different in a wavelength band from the blue light B emitted from the semiconductor laser 41a. By using such light in the near infrared wavelength band, high luminous efficiency can be obtained. Further, by providing the light emitting element 52b for emitting the light different in wavelength band from that of the array light source 41, the functions of the respective light sources can be separated. Therefore, the laser beam from the array light source 41 can appropriately be emitted to the outside.

In the present embodiment, there is used a photodiode made of silicon having high light receiving sensitivity in the near infrared band as the light receiving element 52c. Further, in the present embodiment, since the blue light B emitted from the semiconductor laser 41a is visible light, a filter 53 for cutting visible light and transmitting near infrared ray is disposed on the surface of the light receiving element 52c. According to the above, even in the case in which leakage light of the blue light B having been emitted from the semiconductor laser 41a enters the light receiving element 52c, the leakage light can be cut. Therefore, false detection by the light receiving element 52c can be prevented from occurring.

It should be noted that it is also possible to prevent light other than the detection light (the near infrared light) from affecting the light receiving element 52c by disposing, for example, a light blocking member or an aperture on the light path between the light emitting element 52b and the light receiving element 52c instead of, or in combination with, the filter 53 described above.

Figure 6A:
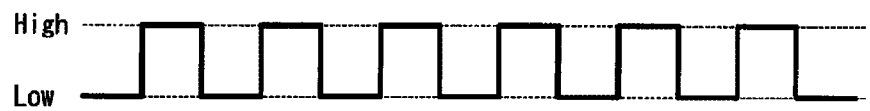
FIGS. 6A, 6B and 6C are diagrams each conceptually showing a waveform of a signal detected by the detector.
Figure 6B:
Figure 6C:

Subsequently, a method for detecting the light from the detection pattern 51 by the detector 52 will be explained with reference to FIG. 6. FIG. 6 are diagrams each for conceptually showing a waveform of a signal detected by the detector 52, wherein FIG. 6A is a diagram showing the signal in a normal state, FIG. 6B is a diagram showing the signal in the case in which a part of the pattern has been lost, and FIG. 6C is a diagram showing the signal in the case in which the rotary plate 48 has disengaged.

The rotary plate 48 rotates in accordance with the rotational drive of the drive motor 50. On this occasion, the light receiving element 52c of the detector 52 detects the periodic signal. The signal to be detected by the light receiving element 52c takes a Low level in the case in which the light is blocked, and takes a High level in the case in which the light enters the light receiving element 52c, for example. In this case, if the rotary plate 48 performs a normal rotational operation, the light receiving element 52c detects the signal having the High level and the Low level periodically continuing as shown in FIG. 6A.

In contrast, in the case in which some trouble occurs in the rotary plate 48 (e.g., in the case in which a breaking or a crack has occurred in the rotary plate 48, or the case in which the rotary plate 48 has disengaged from the rotary shaft 50a), the detector 52 becomes in the state in which the Low level is lost in at least a part of the pattern of the signal to be detected.

In the case in which a breaking or a crack has occurred in the rotary plate 48, a missing section also occurs in a part of the light blocking pattern 51a. In the case in which such a missing section of the light blocking pattern 51a passes a gap between the light emitting element 52b and the light receiving element 52c, since the detection light passes through the missing section, there occurs a zone in which the detection period of the High level is longer than in the normal state. Therefore, as shown in FIG. 6B, the light receiving element 52c detects the signal, which has the High level at least partially continuing, and is irregular in period.

In contrast, in the case in which the rotary plate 48 has disengaged from the rotary shaft 50a, the light blocking patterns 51a fail to pass the gap between the light emitting element 52b and the light receiving element 52c. Therefore, there occurs the state in which the detection light always enters the light receiving element 52c. Therefore, as shown in FIG. 6C, the light receiving element 52c continuously detects only the signal in the High level.

In the present embodiment, the detector 52 detects a predetermined signal from the light having been received from the detection pattern 51, and then transmits the signal thus detected to the control device CONT. The control device CONT determines the state in the rotary plate 48 based on the signal shown in FIGS. 6A through 6C transmitted from the detector 52.

In the case in which the signal shown in FIG. 6A, for example, has been received, the control device CONT determines that no trouble occurs in the rotary plate 48. In this case, the control device CONT continuously drives the array light source 41.

In contrast, in the case in which the signal shown in FIG. 6B or FIG. 6C, for example, has been received, the control device CONT determines that a trouble has occurred in the rotary plate 48. In this case, the control device CONT stops driving the array light source 41. It should be noted that in the present embodiment, the control device CONT also detects the rotational state of the drive motor 50. Therefore, the control device CONT stops the rotation of the drive motor 50 at the timing at which the drive of the array light source 41 is stopped.

Further, since the signal having the High level and the Low level periodically repeated is used as the signal detected by the detector 52, if the light emitting element 52b or the light receiving element 52c in the detector 52 has become to fail to operate properly, generation of the periodic detection signal stops. The control device CONT also stops driving the array light source 41 even in the case in which the detector 52 has become to fail to operate properly. Therefore, by stopping the drive of the array light source 41 also in the case in which the detector 52 has become to fail to operate properly, it is prevented to continue the irradiation with the laser beam in the state in which the trouble in the rotary plate 48 cannot be detected.

As described above, according to the present embodiment, since the detection pattern 51 is disposed at the position different from the position where the light from the array light source 41 enters the light diffusion layer 49, there is no chance that the light emitted from the light diffusion layer 49 and the detection light via the detection pattern are mixed with each other. Therefore, the problem that the light diffused by the light diffusion layer 49 is hindered by the detection pattern 51 can be prevented from occurring. Further, since there is adopted the simple configuration in which the detection pattern 51 is printed on the rotary plate 48, cost reduction can be achieved. Therefore, the second illumination device 4 becomes the illumination device superior in versatility, in which the detection method is not limited irrespective of which one of the transmissive structure and the reflective structure is provided to the rotary plate 48, and the trouble (a fracture or disengagement) caused in the rotary plate 48 can be detected by appropriately detecting the light from the detection pattern 51. Further, by providing the second illumination device 4, the projector 1 becomes high in reliability, and capable of appropriately detecting the trouble in the rotary plate 48 at low cost.

Further, if the rotation of the rotary plate 48 stops, the laser beam enters one point of the rotary plate 48 in a converged state, and there is a possibility that the light diffusion layer 49 or the glass substrate is damaged. According to the present embodiment, by stopping the irradiation with the laser beam in advance, it is possible to prevent the laser beam, which fails to be diffused due to breakage or disengagement of the rotary plate 48, from being emitted to the outside of the main body.

Second Embodiment

Then, a light diffusion element according to a second embodiment will be explained. In the above description of the embodiment, the case in which the detection pattern 51 is constituted by the light blocking patterns 51*a* having a light blocking property is cited as an example. The present embodiment is different in the point that a part of the light diffusion layer, for example, is used as the detection pattern. It should be noted that the rest of the constituents are common to the first embodiment and the third embodiment. Therefore, the constituents common to the embodiments and the members the same as those of the embodiment described above will be denoted by the same reference symbols, and the detailed explanation thereof will be omitted.

Figure 7:
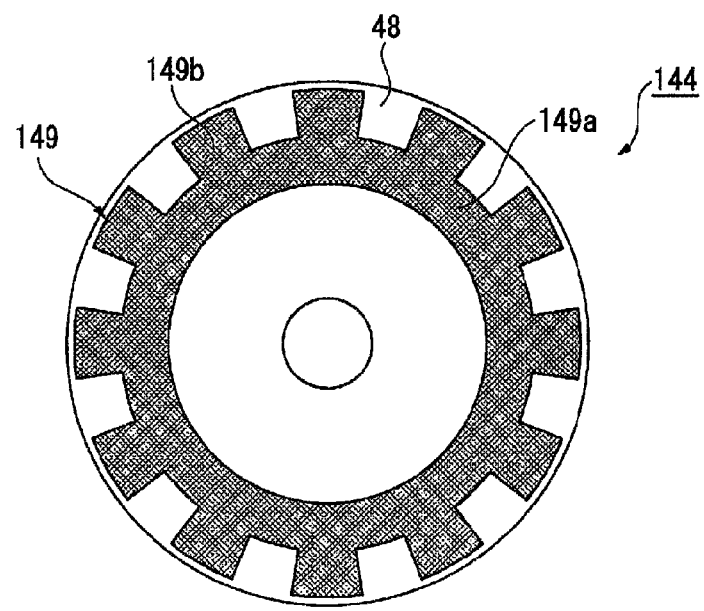
FIG. 7 is a plan view showing a schematic configuration of a light diffusion element according to a second embodiment.
Figure 8A:
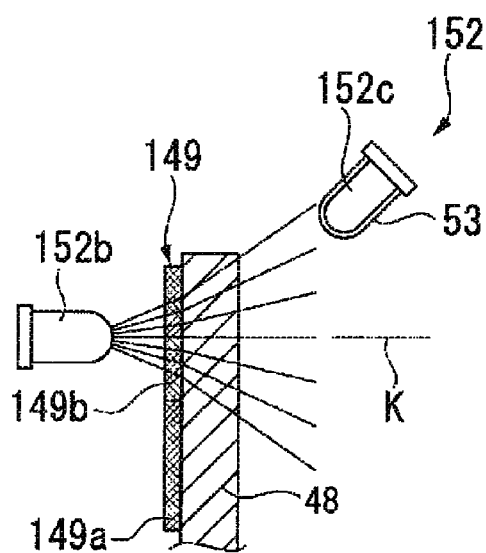
FIG. 8 illustrate diagrams showing a configuration of an essential part of a detector provided to the light diffusion element.
Figure 8B:
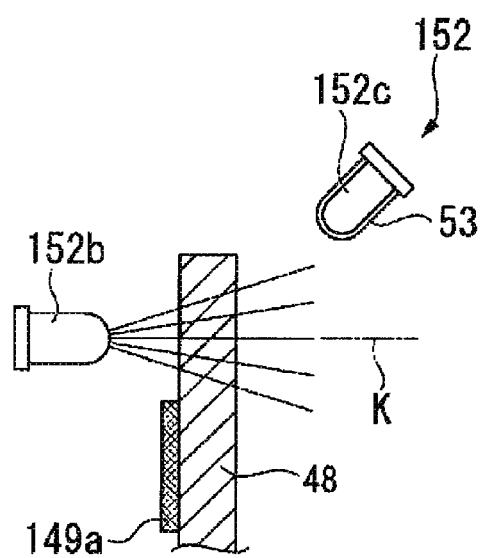

FIG. 7 is a plan view showing a schematic configuration of a light diffusion element 144 according to the present embodiment, which uses a part of a light diffusion layer as the detection pattern. FIG. 8 are diagrams showing a configuration of an essential part of a detector 152 provided to the light diffusion element 144 according to the present embodiment. As shown in FIGS. 7 and 8, the light diffusion element 144 includes the rotary plate 48, a light diffusion layer 149 disposed on the light exit surface side of the rotary plate 48, the drive motor 50 not shown, and a detector 152.

As shown in FIG. 7, the light diffusion layer 149 is disposed on the light exit surface (the first surface) side of the rotary plate 48, and includes a diffusion section 149*a* functioning as a light diffusion section, and a detection section 149*b* functioning as the detection pattern.

The diffusion section 149*a* is disposed on the rotary plate 48 so as to have a ring-like shape. The detection section 149*b* is disposed outer side of the diffusion section 149*a* in the radial direction in the rotary plate 48 and integrally with the diffusion section 149*a*. The detection section 149*b* is disposed in a dashed manner along the rotational direction of the rotary plate 48.

In other words, the detection section 149*b* is disposed at a position different from the position (the area where the diffusion section 149*a* is formed) where the light from the array light source 41 enters the diffusion section 149*a*. The detection section 149*b* and the diffusion section 149*a* are disposed along respective circles concentric with each other with respect to the rotational center (the center) of the rotary plate 48 having a circular shape. Therefore, the distance between the rotational center of the rotary plate 48 and the detection section 149*b* (the circle passing through the center of the detection section 149*b*) is different from the distance between the rotational center and the diffusion section 149*a* (the circle passing through the center of the diffusion section 149*a*).

The detector 152 is electrically connected to the control device CONT (see FIG. 3), and transmits the detection result (the intensity of the light from the detection pattern 51) to the control device CONT. The control device CONT controls the drive of the array light source 41 based on the detection result transmitted (the signal output) from the detector 152.

The detector 152 is formed of a so-called photo interrupter, and includes a light emitting element (the second light source) 152*b* for emitting the near infrared ray, and a light receiving element 152*c* as shown in FIGS. 8(*a*) and 8(*b*). It should be noted that the light emitting element 152*b* and the light receiving element 152*c* are held by a frame member not shown. On the light receiving surface of the light receiving element 152*c*, there is disposed the filter 53 for cutting the visible light and transmitting the near infrared ray.

The light emitting element 152*b* is disposed on the light exit surface side (on the side of the surface on which the light diffusion layer 149 is formed) of the rotary plate 48. The light receiving element 152*c* is disposed at a position, which is located on the surface-of-incidence-of-light side of the rotary plate 48, and is distant outward in the radial direction of the rotary plate 48 from a line K passing through the principal ray of the light entering the detection section 149*b*. In other words, in the case of the planar view of the rotary plate 48, the light receiving element 152*c* is disposed at a position not overlapping the rotary plate 48.

At the timing when the detection section 149*b* is located between the light emitting element 152*b* and the light receiving element 152*c* due to the rotation of the rotary plate 48, the state shown in FIG. 8(*a*) occurs. As shown in FIG. 8(*a*), the detection light emitted from the light emitting element 152*b* enters the detection section 149*b*. The detection light having entered the detection section 149*b* is diffused to radially spread. Therefore, the light receiving element 152*c* disposed on the outer side of the rotary plate 48 can receive the detection light diffused by the detection section 149*b*.

In contrast, at the timing when the detection section 149*b* is absent between the light emitting element 152*b* and the light receiving element 152*c* due to the rotation of the rotary plate 48, the state shown in FIG. 8(*b*) occurs. As shown in FIG. 8(*b*), the detection light emitted from the light emitting element 152*b* is transmitted through the rotary plate 48. On this occasion, the detection light is not diffused, and therefore, fails to enter the light receiving element 152*c* disposed on the outer side of the rotary plate 48.

Also in the present embodiment, the light receiving element 152*c* detects the periodic signal in accordance with the rotational drive of the rotary plate 48. The signal detected by the light receiving element 152c takes the High level in the case in which the detection light diffused has been received, and takes the Low level in the case in which the detection light has failed to be received, for example. In this case, if the rotary plate 48 performs a normal rotational operation, the light receiving element 152c detects the signal (see FIG. 6A) having the High level and the Low level periodically continuing.

In contrast, in the case in which some trouble has occurred in the rotary plate 48, the detector 152 detects the signal, which has the Low level at least partially continuing, and is irregular in period (see FIGS. 6B and 6C).

Also in the present embodiment, since the detection section 149b is disposed at the position different from the position where the light from the array light source 41 enters the diffusion section 149a, there is no chance for the light having been emitted from the diffusion section 149a and the detection light having been transmitted through the detection section 149b to be mixed with each other, and thus, the trouble (a fracture or disengagement) caused in the rotary plate 48 can appropriately be detected.

Further, since the diffusion section 149a and the detection section 149b can integrally be formed in the same manufacturing process, the productivity is enhanced, and thus, the further reduction in manufacturing cost can be achieved.

Third Embodiment

Then, a light diffusion element according to a third embodiment will be explained. In the above description of the first embodiment, the case in which the detection pattern 51 is formed of the plurality of light-blocking patterns 51a is cited as an example. The present embodiment is different in the point that the detection pattern is formed of a single ring-like light blocking pattern. It should be noted that the rest of the constituents are common to the first embodiment described above and the third embodiment. Therefore, the constituents common to the embodiments and the members the same as those of the embodiment described above will be denoted by the same reference symbols, and the detailed explanation thereof will be omitted.

Figure 9A:
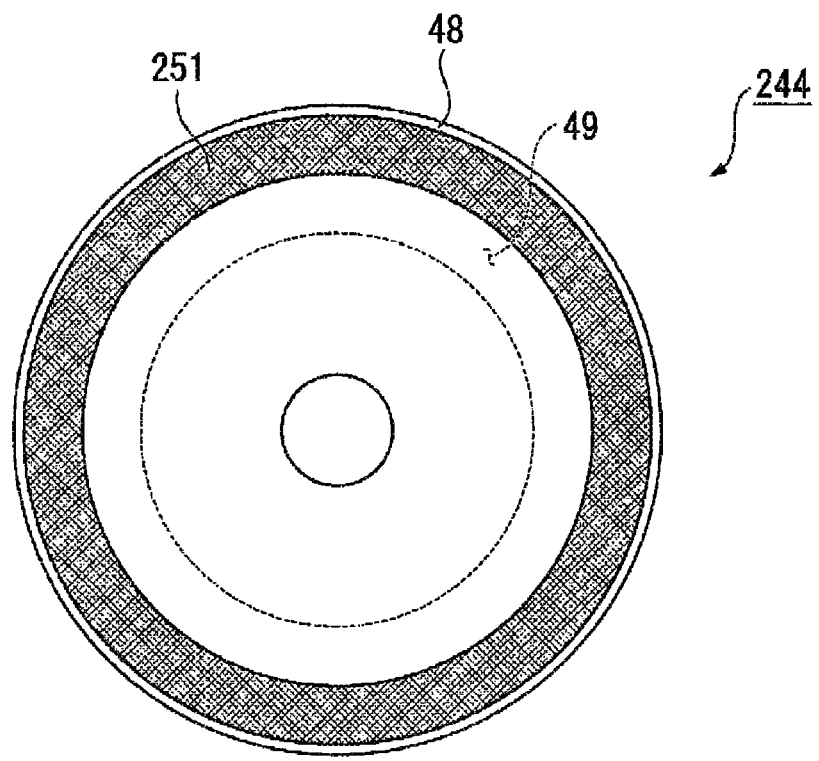
FIG. 9 illustrate diagrams showing a schematic configuration of a light diffusion element according to a third embodiment.
Figure 9B:
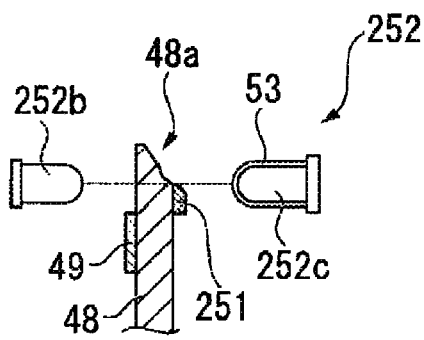

FIG. 9 are diagrams showing a schematic configuration of a light diffusion element 244 in the present embodiment, wherein FIG. 9 (a) shows a planar configuration of the rotary plate 48 viewed from the surface-of-incidence-of-light side, and FIG. 9(b) is a diagram showing a configuration of an essential part of a detector 252 according to the light diffusion element 244 in the present embodiment.

As shown in FIGS. 9(a) and 9(b), the light diffusion element 244 includes the rotary plate 48, a detection pattern 251, the light diffusion layer 49, the drive motor 50 not shown, and the detector 252. In the present embodiment, the detection pattern 251 is disposed along the circumferential direction of the rotary plate 48 so as to form a ring-like shape.

The detector 252 is electrically connected to the control device CONT (see FIG. 3), and transmits the detection result (the intensity of the light from the detection pattern 251) to the control device CONT. The control device CONT controls the drive of the array light source 41 based on the detection result transmitted (the signal output) from the detector 252.

The detector 252 is formed of a so-called photo interrupter, and includes a light emitting element (the second light source) 252b for emitting the near infrared ray, and a light receiving element 252c as shown in FIG. 9 (b). It should be noted that the light emitting element 252b and the light receiving element 252c are held by a frame member not shown. On the light receiving surface of the light receiving element 252c, there is disposed the filter 53 for cutting the visible light and transmitting the near infrared ray.

In the present embodiment, in the case in which the rotary plate 48 is rotating in the normal state, the detection pattern 251 is always located between the light emitting element 252b and the light receiving element 252c. Therefore, there occurs the state in which the detection light emitted from the light emitting element 252b is blocked by the detection pattern 251. Therefore, there is no chance for the light receiving element 252c to receive the detection light.

In contrast, in the case in which a trouble has occurred (e.g., the case in which a crack, a fracture, or disengagement has occurred) in the rotary plate 48, the state shown in FIG. 9 (b) occurs. For example, if an end portion of the rotary plate 48 has been broken and lost, a missing section 48a occurs in the end portion of the rotary plate 48 as shown in FIG. 9 (b). If the missing section 48a occurs in the rotary plate 48 due to a crack, a chap, or the like, the detection light having been emitted from the light emitting element 252b is emitted toward the light receiving element 252c via the missing section 48a. Therefore, the light receiving element 252c can receive the detection light emitted via the missing section 48a.

In the present embodiment, the light receiving element 252c detects a constant signal in accordance with the normal rotational drive (the rotational drive in the state in which no trouble occurs) in the rotary plate 48. The signal detected by the light receiving element 252c takes the High level in the case in which the detection light has been received, and takes the Low level in the case in which the detection light has failed to be received, for example. On this occasion, if the rotary plate 48 performs the normal rotational operation, it results that the light receiving element 252c always detects the signal in the Low level.

According to the present embodiment, in the case in which the trouble such as a breaking, a crack, or disengagement occurs in the rotary plate 48, the signal in the High level is detected by the light receiving element 252c. Therefore, the trouble having occurred in the rotary plate 48 can appropriately be detected. It should be noted that in the configuration of the present embodiment, since the signal from the detection pattern 251 is constant, it is not achievable to detect the rotation of the rotary plate 48. Therefore, in the present embodiment, the control device CONT detects the rotational state of the drive motor 50. Therefore, even in the case in which, for example, a failure occurs in the detector 252, it is possible to prevent occurrence of the trouble that the laser beam continuously enters the rotary plate 48 while the rotation of the rotary plate 48 is stopped, and thus, the rotary plate 48 is damaged.

Fourth Embodiment

Then, a light diffusion element according to a fourth embodiment will be explained. In the first through third embodiments described above, the illumination device using the transmissive rotary diffusion plate as the rotary diffusion plate provided with the diffusion section is cited as an example. The present embodiment is different in the point that it is applied to an illumination device provided with a transmissive phosphor wheel. It should be noted that members the same as those of the embodiments described above will be denoted by the same reference symbols, and the detailed explanation thereof will be omitted.

Figure 10:
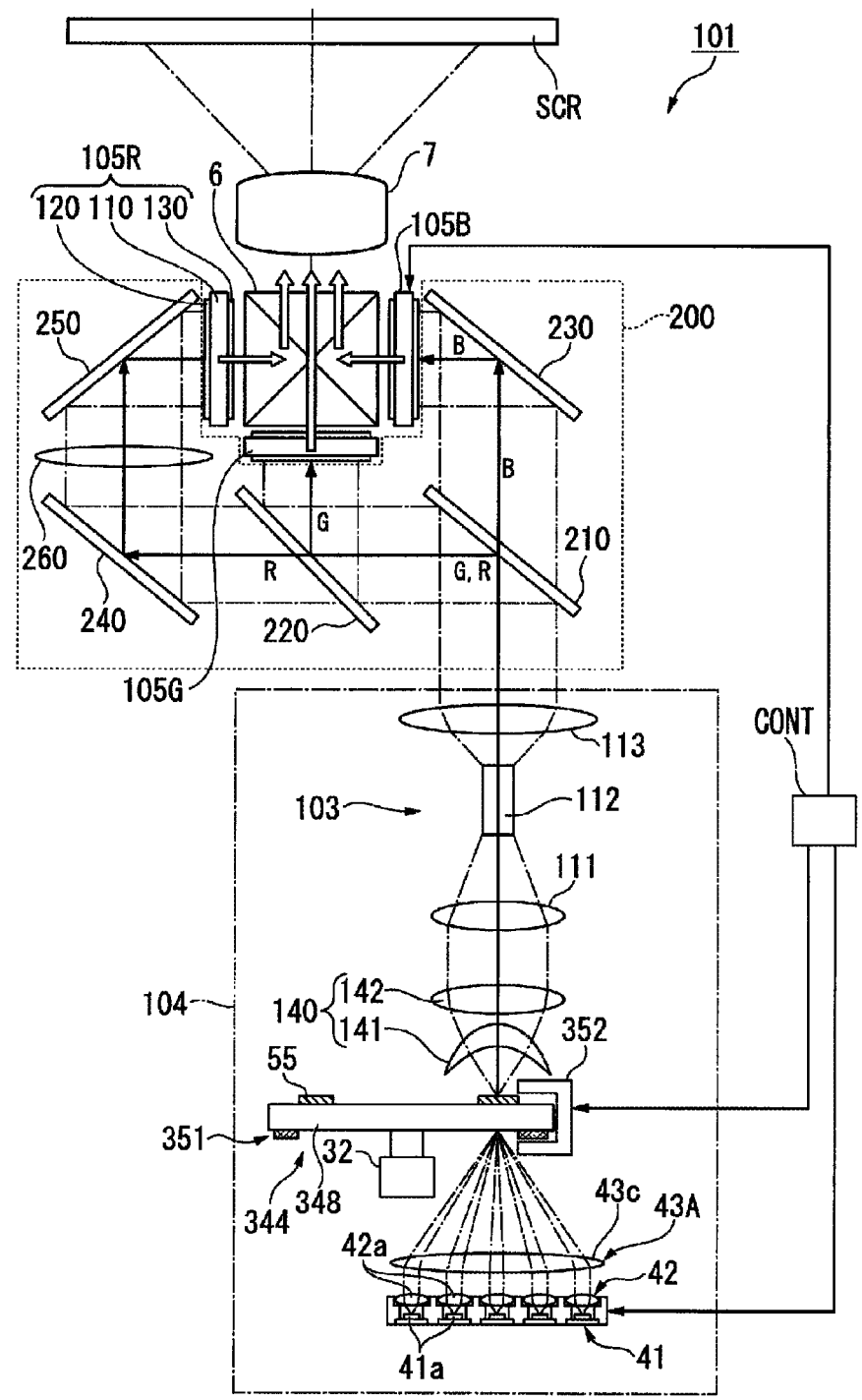
FIG. 10 is a diagram showing a schematic configuration of a projector according to a fourth embodiment.

FIG. 10 is a diagram showing a schematic configuration of a projector and an illumination device according to the present embodiment. As shown in FIG. 10, a projector 101 is provided with an illumination device 104, a color separation light guide optical system 200, a liquid crystal light modulation device 105R, a liquid crystal light modulation device 105G, and a liquid crystal light modulation device 105B as light modulation devices, the combining optical system 6, the projection optical system 7, and the control device CONT.

The illumination device 104 is provided with the array light source 41, the collimator optical system 42, the light collection optical system 43A, a fluorescence emitting element 344, a collimating optical system 140, and an illumination optical system 103. On the light path of the excitation light emitted from the array light source 41, the collimator optical system 42, the light collection optical system 43A, the fluorescence emitting element 344, the collimating optical system 140, and the illumination optical system 103 are arranged in this order.

The fluorescence emitting element 344 is a so-called transmissive rotary phosphor plate, and is provided with a phosphor layer (a diffusion section) 55 for emitting the fluorescent light Y, a rotary plate 348 for supporting the phosphor layer 55, and the drive motor 32 for rotationally driving the rotary plate 348.

FIG. 11 are diagrams showing a configuration of the fluorescence emitting element 344, wherein FIG. 11A is a plan view of the fluorescence emitting element 344, and FIG. 11B is a cross-sectional view of the fluorescence emitting element 344. FIG. 12 are diagrams showing a configuration of an essential part of a detector 352 provided to the fluorescence emitting element 344 according to the present embodiment.

As shown in FIGS. 11A and 11B, in the fluorescence emitting element 344, on the surface-of-incidence-of-light (a second surface) side of the rotary plate 348, there is disposed a detection pattern 351 along the circumferential direction. In the present embodiment, the detection pattern 351 has a plurality of diffusion patterns 351a each formed of a light diffusion layer having the same configuration as that of the light diffusion layer 149 shown in FIG. 7. Further, on the light exit surface (a first surface) of the rotary plate 348, there is disposed a fluorescence emitting region around the rotational axis of the rotary plate 348, and in the fluorescence emitting region, there is disposed the phosphor layer 55.

In other words, the detection pattern 351 is disposed at a position different from the position (the fluorescence emitting region) where the light from the array light source 41 enters the phosphor layer 55. The detection pattern 351 and the phosphor layer 55 are disposed along respective circles concentric with each other with respect to the rotational center (the center) of the rotary plate 348 having a circular shape. Therefore, the distance between the rotational center of the rotary plate 348 and the detection pattern 351 (the circle passing through the center in the radial direction of each of the diffusion patterns 351a) is different from the distance between the rotational center and the phosphor layer (the circle passing through the center in the radial direction of the fluorescence emitting region).

The plurality of diffusion patterns 351a is disposed in a dashed manner along the rotational direction of the rotary plate 348.

In the present embodiment, the phosphor layer 55 is irradiated with the excitation light (the blue light) collected by the collecting lens 43c from a surface on an opposite side to the side, on which the phosphor layer 55 is formed, of the rotary plate 348. Further, the fluorescence emitting element 344 emits the fluorescence generated by the phosphor layer 55 toward the side to the side to which the excitation light is input, namely toward the collimating optical system 40. Further, the component of the excitation light, which has failed to be converted by the phosphor particles into the fluorescence, is emitted together with the fluorescence from the fluorescence emitting element 344 toward the collimating optical system 40. Therefore, white light is emitted from the fluorescence emitting element 344 toward the collimating optical system 140.

The collimating optical system 140 is disposed on the light path of the light (the excitation light and the fluorescence) between the fluorescence emitting element 344 and the illumination optical system 103. The collimating optical system 140 includes a first lens 141 for suppressing the spread of the light from the fluorescence emitting element 344, and a second lens 142 for collimating the light input from the first lens 141. The first lens 141 is formed of, for example, a convex meniscus lens, and the second lens 142 is formed of, for example, a convex lens. The collimating optical system 140 makes the light from the fluorescence emitting element 344 enter the illumination optical system 103 in a roughly collimated state.

The illumination optical system 103 is disposed on the light path between the illumination device 104 and the color separation light guide optical system 200. The illumination optical system 103 is provided with a collecting lens (a light collection optical system) 111, a rod integrator 112, and a collimating lens 113.

The collecting lens 111 is formed of, for example, a convex lens. The collecting lens 111 is disposed on the ray axis of the light input from the collimating optical system 140, and collects the light thus input.

The light having been transmitted through the collecting lens 111 enters one end side of the rod integrator 112. The rod integrator 112 is an optical member having a prismatic shape extending in the light path direction, and causes the multiple reflection in the light passing through the inside thereof to thereby mix the light having been transmitted through the collecting lens 111, and thus homogenizes the luminance distribution. The shape of the cross-section of the rod integrator 112 perpendicular to the light path direction is arranged to be roughly similar to the outer shape of the image forming area of each of the liquid crystal light modulation device 105R, the liquid crystal light modulation device 105G, and the liquid crystal light modulation device 105B.

The light having been emitted from the other end side of the rod integrator 112 is collimated by the collimating lens 113, and is then emitted from the illumination optical system 103.

The color separation light guide optical system 200 is provided with a dichroic mirror 210, a dichroic mirror 220, a reflecting mirror 230, a reflecting mirror 240, a reflecting mirror 250, and a relay lens 260. The color separation light guide optical system 200 has a function of separating the light from the illumination optical system 103 into the red light R, the green light G, and the blue light B, and then guiding the colored light beams of the red light R, the green light G, and the blue light B to the liquid crystal light modulation device 105R, the liquid crystal light modulation device 105G, and the liquid crystal light modulation device 105B to be the illumination objects, respectively.

The dichroic mirror 210 and the dichroic mirror 220 are each a mirror provided with a wavelength selecting transmissive film formed on a substrate, the wavelength selecting transmissive film reflecting the light in a predetermined wavelength band and transmitting the light in another wavelength band. Specifically, the dichroic mirror 210 transmits the blue light component while reflecting the red light component and the green light component. The dichroic mirror 220 reflects the green light component while transmitting the red light component.

The reflecting mirror 230, the reflecting mirror 240, and the reflecting mirror 250 are each a mirror for reflecting the incident light. Specifically, the reflecting mirror 230 reflects the blue light component having been transmitted through the dichroic mirror 210. The reflecting mirror 240 and the reflecting mirror 250 reflect the red light component having been transmitted through the dichroic mirror 220.

The blue light having been transmitted through the dichroic mirror 210 is reflected by the reflecting mirror 230, and then enters an image forming area of the liquid crystal light modulation device 105B for the blue light. The green light having been reflected by the dichroic mirror 210 is further reflected by the dichroic mirror 220, and then enters an image forming area of the liquid crystal light modulation device 105G for the green light. The red light having been transmitted through the dichroic mirror 220 enters an image forming area of the liquid crystal light modulation device 105R for the red light via the reflecting mirror 240 on the entrance side, the relay lens 260, and the reflecting mirror 250 on the exit side.

In the present embodiment, the liquid crystal light modulation device 105R, the liquid crystal light modulation device 105G, and the liquid crystal light modulation device 105B are each formed of a transmissive liquid crystal light valve unlike the embodiments described above. Each of the liquid crystal light modulation devices 105R, 105G, and 105B has, for example, a liquid crystal element 110, and an entrance side polarization plate 120, an exit side polarization plate 130 sandwiching the liquid crystal element 110. The entrance side polarization plate 120 and the exit side polarization plate 130 have, for example, a configuration (a cross-Nicol arrangement) having the transmission axes perpendicular to each other.

The image light emitted from the combining optical system 6 is projected on the screen SCR by the projection optical system 7 in an enlarged manner, and is visually recognized by the eyes of the user as a color image.

As described above, in the projector 101 according to the present embodiment, the screen SCR is irradiated with the laser beam emitted from the array light source 41 and transmitted through the phosphor layer 55.

The detector 352 includes a light emitting element (the second light source) 352b for emitting the near infrared ray, and a light receiving element 352c as shown in FIGS. 12(a) and 12(b). It should be noted that the light emitting element 352b and the light receiving element 352c are held by a frame member not shown. On the light receiving surface of the light receiving element 352c, there is disposed the filter 53 for cutting the visible light and transmitting the near infrared ray.

The light emitting element 352b is disposed on the surface-of-incidence-of-light side (on the side of the surface on which the detection pattern 351 is formed) of the rotary plate 348. The light receiving element 352c is disposed at a position, which is located on the light exit surface side of the rotary plate 348, and is distant outward in the radial direction of the rotary plate 348 from the line K passing through the principal ray of the light entering the detection pattern 351. In other words, in the case of the planar view of the rotary plate 348, the light receiving element 352c is disposed at a position not overlapping the rotary plate 348.

At the timing when the diffusion pattern 351a is located between the light emitting element 352b and the light receiving element 352c due to the rotation of the rotary plate 348, the state shown in FIG. 12(a) occurs. As shown in FIG. 12(a), the detection light emitted from the light emitting element 352b enters the diffusion pattern 351a. The detection light having entered the diffusion pattern 351a is diffused to radially spread. Therefore, the light receiving element 352c disposed on the outer side of the rotary plate 348 can receive the detection light diffused by the diffusion pattern 351a.

In contrast, at the timing when the diffusion pattern 351a is absent between the light emitting element 352b and the light receiving element 352c due to the rotation of the rotary plate 348, the state shown in FIG. 12(b) occurs. As shown in FIG. 12(b), the detection light emitted from the light emitting element 352b is transmitted through the rotary plate 348. On this occasion, the detection light is not diffused, and therefore, fails to enter the light receiving element 352c disposed on the outer side of the rotary plate 348.

Also in the present embodiment, the light receiving element 352c detects the periodic signal in accordance with the rotational drive of the rotary plate 348. In the signal detected by the light receiving element 352c, assuming that the case in which the detection light thus diffused has been received corresponds to the High level, and the case in which the detection light has failed to be detected corresponds to the Low level, if the rotary plate 348 performs the normal rotational operation, the light receiving element 352c can detect the signal (see FIG. 6A) having the High level and the Low level periodically continuing.

In contrast, in the case in which some trouble has occurred in the rotary plate 348, the detector 352 detects the signal, which has the Low level at least partially continuing, and is irregular in period (see FIGS. 6B and 6C).

Also in the present embodiment, since the detection pattern 351 is disposed at the position different from the position where the light from the array light source 41 enters the phosphor layer 55, there is no chance for the fluorescent light Y having been emitted from the phosphor layer 55 and the detection light in the detection pattern 351 to be mixed with each other, and thus, the trouble (a fracture or disengagement) caused in the rotary plate 348 can appropriately be detected.

It should be noted that the invention is not necessarily limited to the embodiments described above, but a variety of modifications can be added thereto within the scope or the spirit of the invention.

For example, although in the embodiments described above, the case in which the diffused light or the transmitted light from the detection patterns 51, 251, 351, and the detection section 149b is used as the detection light is cited as an example, the invention is not limited thereto, but it is also possible to use the reflected light as the detection light. In this case, it is sufficient for the detection section provided to the rotary plate to have a reflection characteristic of reflecting at least a part of the detection light. Further, it is also possible to arrange that an element having a characteristic of reflecting a part of the detection light and transmitting the rest of the detection light is used as the detection section, and the detection signal of the rotary plate is obtained based on the detection light obtained by combining one of the diffused light and the transmitted light, and the reflected light with each other.

Further, although in the first embodiment described above, the detection pattern 51 is disposed on the outer side of the light diffusion layer 49 in the radial direction in the rotary plate 48, the invention is not limited to this configuration, but it is possible for the light diffusion layer 49 to be disposed on the outer side of the detection pattern 51 in the radial direction in the rotary plate 48.

Further, although in the second embodiment described above, the detection section 149b is disposed on the outer side of the diffusion section 149a in the radial direction in the rotary plate 48, the invention is not limited to this configuration, but it is also possible for the diffusion section 149a to be disposed on the outer side of the detection section 149b in the radial direction in the rotary plate 48.

Further, although in the third embodiment described above, the detection pattern 251 is disposed on the outer side of the light diffusion layer 49 in the radial direction in the rotary plate 48, the invention is not limited to the configuration, but it is also possible for the light diffusion layer 49 to be disposed on the outer side of the detection pattern 251 in the radial direction in the rotary plate 48.

Further, although in the fourth embodiment described above, the detection pattern 351 is disposed on the outer side of the phosphor layer 55 in the radial direction in the rotary plate 348, the invention is not limited to this configuration, but it is also possible for the phosphor layer 55 to be disposed on the outer side of the detection pattern 351 in the radial direction in the rotary plate 348.

Further, although in each of the embodiments described above, there is cited as an example the projector 1 provided with the three light modulation devices 5R, 5G, and 5B, the invention can also be applied to a projector for displaying a color image (an image) using a single light modulation device. Further, the light modulation device is not limited to the liquid crystal panel, but there can also be used, for example, a digital mirror device (DMD, a registered trademark of the Texas Instruments).

Further, although in the fourth embodiment described above, the illumination device using the transmissive rotary phosphor plate is cited as an example, the invention is not limited to this configuration, but can also be applied to an illumination device using a reflective rotary phosphor plate. In other words, it is also possible to arrange that the rotational state of the rotary plate 31 of the first illumination device 2 according to the first embodiment is detected, and then the drive of the array light source 21 is controlled based on the detection result.

The entire disclosure of Japanese Patent Application No. 2013-162610, filed on Aug. 5, 2013 is expressly incorporated by reference herein.

The invention claimed is:

1. An illumination device comprising:
a light source device which includes a first light source and a second light source;
a rotary diffusion plate, which includes a first surface, a second surface, a diffusion section disposed on the first surface, and a detection section disposed on at least one of the first surface and the second surface, and to which light from the light source device is input;
a light collection optical system to which light from the diffusion section is input;
a detector adapted to detect light from the detection section; and
a control device adapted to control the light source device in accordance with a signal output from the detector,
wherein light from the first light source enters the diffusion section,
wherein light from the second light source enters the detection section,
wherein the detection section includes a plurality of detection patterns,
wherein the detection section is disposed at a position different from a position where the light from the light source device enters the diffusion section, and
wherein the detection section is disposed along a circumferential direction of the rotary diffusion plate.

2. The illumination device according to claim 1, wherein the detection section blocks at least a part of the light input.

3. The illumination device according to claim 2, wherein the detection section is disposed on the second surface.

4. The illumination device according to claim 1, wherein the detection section diffuses at least a part of the light input.

5. The illumination device according to claim 4, wherein the detection section is disposed on the first surface.

6. The illumination device according to claim 4, wherein the detector is disposed at a position distant from an extension line of a principal ray of the light input to the detection section.

7. The illumination device according to claim 1, wherein the light emitted from the first light source and the light emitted from the second light source are different in wavelength band from each other.

8. The illumination device according to claim 1, wherein the detection section reflects at least a part of the light input.

9. The illumination device according to claim 1, wherein the detection section includes the plurality of detection patterns disposed in a dashed manner along a rotational direction of the rotary diffusion plate.

10. The illumination device according to claim 1, wherein the diffusion section is a phosphor layer.

11. A projector comprising:
an illumination device adapted to emit illumination light;
a light modulation device adapted to modulate the illumination light in accordance with image information to thereby form image light; and
a projection optical system adapted to project the image light,
wherein the illumination device according to claim 1 is used as the illumination device.

12. The illumination device according to claim 1, wherein a radial distance between a rotational center of the rotary diffusion plate and the detection section is different than a radial distance between the rotational center of the rotary diffusion plate and the diffusion section.

13. An illumination device comprising:
a light source device;
a rotary diffusion plate, which includes a first surface, a second surface, a diffusion section disposed on the first surface, and a detection section disposed on at least one of the first surface and the second surface, and to which light from the light source device is input;
a light collection optical system to which light from the diffusion section is input;
a detector adapted to detect light from the detection section; and
a control device adapted to control the light source device in accordance with a signal output from the detector,
wherein:
the detection section includes a plurality of detection patterns, the detection section is disposed at a position different from a position where the light from the light source device enters the diffusion section, and the control device is adapted to determine a state in the rotary diffusion plate by whether the signal is periodic or not, the light source device includes a first light source and a second light source, light from the first light source enters the diffusion section, and light from the second light source enters the detection section.

14. The illumination device according to claim 13, wherein the control device is adapted to stop driving the light source device in case the signal transmitted from the detector is a non-periodic when the rotary diffusion plate is rotating.

15. The illumination device according to claim 13, wherein the light emitted from the first light source and the light emitted from the second light source are different in wavelength band from each other.

16. The illumination device according to claim 13, wherein the detection section includes the detection pattern disposed in a dashed manner along a rotational direction of the rotary diffusion plate.

17. The illumination device according to claim 13, wherein the detector is adapted to output the signal having a High level and a Low level continuing periodically.

18. A projector comprising:

an illumination device adapted to emit illumination light;

a light modulation device adapted to modulate the illumination light in accordance with image information to thereby form image light; and a projection optical system adapted to project the image light, wherein the illumination device according to claim 13 is used as the illumination device.

* * * * *